United States Patent [19]
Yuan

[11] 4,346,569
[45] * Aug. 31, 1982

[54] NATURAL ICE FOR COOLING ENERGY

[76] Inventor: Shao W. Yuan, 6701 Montour Dr., Falls Church, Va. 22043

[*] Notice: The portion of the term of this patent subsequent to Dec. 23, 1997, has been disclaimed.

[21] Appl. No.: 218,800

[22] Filed: Dec. 22, 1980

Related U.S. Application Data

[63] Continuation-in-part of Ser. No. 951,518, Oct. 13, 1978, Pat. No. 4,240,268.

[51] Int. Cl.³ .............................................. F25D 23/12
[52] U.S. Cl. ..................................... 62/260; 126/400; 165/45
[58] Field of Search ........................... 62/260; 165/45; 126/400

[56] References Cited

U.S. PATENT DOCUMENTS

| | | | |
|---|---|---|---|
| 4,011,736 | 3/1977 | Harrison | 62/260 |
| 4,091,636 | 5/1978 | Margen | 165/45 X |
| 4,138,995 | 2/1979 | Yuan | 126/400 X |
| 4,240,268 | 12/1980 | Yuan | 126/400 X |

*Primary Examiner*—Lloyd L. King

[57] ABSTRACT

A system for transmitting, storing and utilizing cold which includes the use of heat pipes for transmitting the winter cold to cool the anti-freezing liquid in the ground cold storage which in turn freeze the water bags installed in the cold storage. When the complete air-conditioning system in a cooling environment is in operation, the coolant in the cold storage will be circulated through a bank of tubes situated inside the air-conditioning duct for cooling air as required. The system provides for long-duration earth storage of winter cold which can be effectively used during warm seasons for space cooling and cold storage.

12 Claims, 1 Drawing Figure

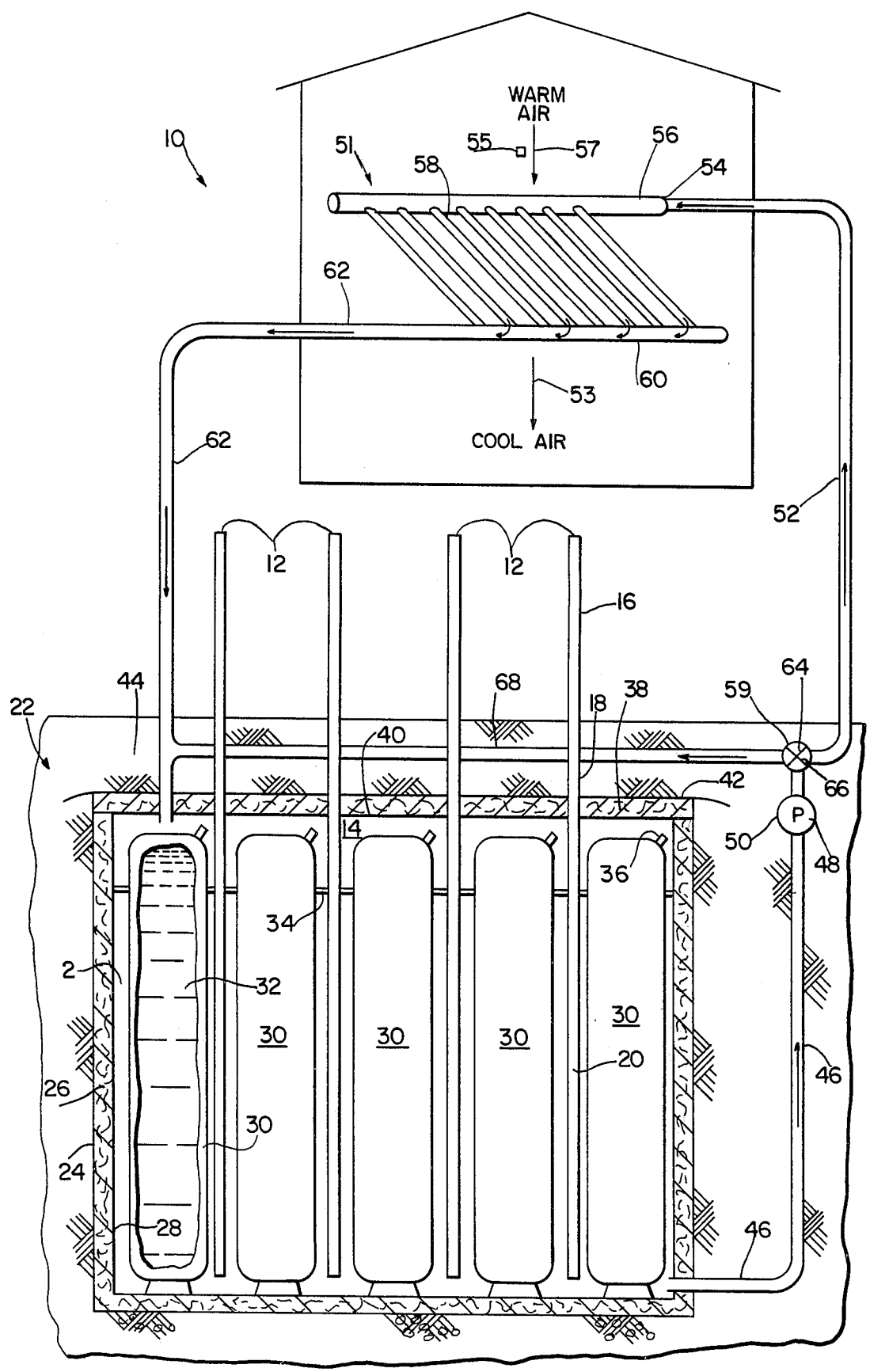

NATURAL ICE FOR COOLING ENERGY

This is a continuation-in-part of my pending application Ser. No. 951,518, filed Oct. 13, 1978 to be issued as U.S. Pat. No. 4,240,268. I hereby incorporate this patent by reference.

BACKGROUND OF THE INVENTION

1. Field of the Invention

The present invention relates to utilizing winter cold more particularly to transmitting and storing winter cold underground for effective uses during summer seasons.

2. Description of the Prior Art

Prior art ground cold storage systems are generally accomplished by blowing winter cold ambient air to pass through the cold reservoir formed by crushed stones and rock beds. In other cases, cold liquid medium is pumped through pipes embedded in stone and rock medium in the form of which constitutes a closed heat-exchange system.

The stones and rocks, as a cold storage reservoir, have several shortcomings. First, cold storage capacities are limited because of the narrow temperature range for cooling. In other words, the difference of storage temperature in winter and upper-limit useful temperatures in summer is less than thirty degrees Fahrenheit (30° F. to 60° F.). For example, in a volume of one cubic foot of stone at a temperature difference of 30° F., the energy flux is about $1.3 \times 10^3$ BTU. Assuming a summer requirement of $25 \times 10^6$ BTU for an average size home, a volume of cold storage required for cooling is estimated at $20 \times 10^3$ cubic feet. In contrast to this large volume, if ice is used for cold storage instead of rock, the required storage volume is about $2.5 \times 10^3$ cubic feet.

Another shortcoming of the stone and rocks as cold storage is the low thermal conductivity. It would require a long length of liquid pipes and considerable pumping power in order to meet the maximum cooling rate required during hot summer days.

SUMMARY OF INVENTION

This invention relates to a system for transmitting, storing and utilizing winter cold, and more particularly, to a system in which winter cold can be stored underground for subsequent cooling utilization during summers without relying on conventional air-conditioning systems.

The invention contemplates a novel system for transmitting, storing and utilizing cold wherein the system comprises means for transmitting the winter cold above ground to freeze bags of water in a reservoir below the surface of the ground, and circulation means to circulate the stored cold to the ventilation air duct which cools and dehumidifies the returning warm air flow from the space cooling in an air-conditioning system.

For accomplishing the foregoing objective, the invention contemplates the use of heat pipes for transmission of the winter cold to an underground coolant (antifreezing liquid) tank. The coolant in the tank is cooled and finally reaches temperatures below 32° F. during the winter season. In turn, the coolant freezes the water inside the plastic bags which are installed in the coolant tank. Since the condenser sections of the heat pipes are above the surface of the ground and the evaporation sections of the heat pipes are situated inside the coolant tank below, neither pump nor thermostat control is required for this system. The mechanical simplicity and the effortless maintenance of this system are evident.

The extraction of cold from the cold reservoir for space cooling and cold storage is accomplished by pumping the coolant from the reservoir through a closed piping loop. When air conditioning is in operation the coolant is pumped from the reservoir through the piping loop to a bank of tubes situated in the ventilation air duct system. As the returning warm air from rooms or other environment passes the bank of coolant tubes in the ventilation air duct, it loses heat to coolant in the tubes. The coolant then flows back through the piping loop to the cold reservoir. In the process of coolant recirculation in the cold reservoir, it is cooled by the ice bags and the coolant circulation cycle repeats.

Accordingly, an important object of the invention is to provide for long-duration underground storage of winter cold which can be used for space cooling and cold storage when air-conditioning is required, without relying on energy from fossil fuel such as conventional air-conditioning units.

Another important object of the invention is to provide a highly effecient means for transmitting cold from the subfreezing atmosphere or environment into the ground for cold reservoir through the use of heat pipes without the aid of energy consumption pumps and thermostatic control.

A further and important object of the invention is to provide a plurality of plastic water bags inside the cold storage reservoir filled with antifreeze liquid; thereby a considerable increase in heat transfer rate between the heat pipe and the antifreeze liquid can be achieved. This, in turn, increases the rate of ice forming.

A still further and important object of the invention is to provide means to make and store ice in an underground reservoir, thereby a considerable reservoir volume can be reduced for the same cold storage capacity of conventional stones and rocks type.

A stll further object of the invention is to provide a very quiet air-conditioning system which is free from compressor noise.

A still further object of the invention is to provide an economical air-conditioning system which is almost free from maintenance and utility costs.

Further objects and advantages of my invention will become apparent from an understanding of the following detailed description of preferred embodiment of my invention.

DESCRIPTION OF THE FOLLOWING

The FIGURE is a diagrammatic sectional view of a system for transmitting, storing and utilizing cold in accordance with the present invention.

DESCRIPTION OF THE PREFERRED EMBODIMENT

Referring to the drawing, the novel transmitting, storing and utilizing system of atmospheric cold, generally indicated by number 10, includes a series of heat pipes 12 for collecting and transmitting cold above the ground into an underground liquid coolant tank 14. I define the liquid coolant which remains in liquid state under all cold atmospheric conditions that may be transmitted by the heat pipe to the said liquid coolant. The heat pipe includes a condenser section 16, an adiabatic section 18, and an evaporator section 20 as well as containing a working fluid (not illustrated). Briefly, cold is absorbed by the condenser section 16 which causes the vapor therein to condense, and the condensed liquid then flows downward through the adiabatic section 18 to the evaporator section 20 which is located inside the liquid coolant tank 14. While the condensed working fluid in the evaporator section 20 of the heat pipe extracts heat from the surrounding liquid coolant 2, it changes its phase to vapor which flows upward to the condenser section 16, and the cold absorption and heat extraction cycle repeats.

At location 22, represented by a pit or excavated volume of earth where the cold storage tank 14 is embedded. The pit 22 is coated with a layer of foam synthetic plastics 24 and lined with rigid insulation material 26 which would hold its shape under hydrostatic pressure. The interior surface 26 of the insulation 28 is lined with a plastic sheet barrier. The shape of the tank 14 can be cylindrical, cubic or any other suitable form which encloses plastic bags 30 containing water 32 and is filled with liquid coolant 2. On the other hand, the tank 14 can be prefabricated like concentric rigid shells with insulating material in between. The size and the skin thickness of the water bags 30 are determined by the heat transfer rate between the liquid coolant 2 and water 32. Furthermore, the plastic material of the water bags 30 must have sufficient strength to withstand the hydrostatic pressure of water 32 and sufficient elasticity to expand when water 32 freezes. The bags 30 are held in place by elastic supporters 34 and have filling tubes 36 in order that water can be filled after the installation of the bags.

During the freezing weather, cold is absorbed by the condenser section 16 of the heat pipe 12 which causes the vapor therein to condense, and the condensed liquid at the sub-freezing temperature then flows downward to the evaporator section 20. In this continuously automatic process of cold absorption and heat extraction, the liquid coolant 2 in the tank 14 will eventually reach temperatures below 32° F. which, in turn, freezes the water within the bags 30. This constitutes the cooling and freezing process of the cold storage reservoir without any aid of energy operated pump and controls.

In order to prevent the penetration of summer heat to the cold storage tank 14, a layer of insulating material 38 is placed above the cover 40 of the tank 14. It is preferable that the insulating material 38 is covered by a sheet of plastic 42 which, in turn, is covered by a thick layer of soil 44. At the bottom of the tank 14 it is preferable to lay a few layers of gravel or rocks so that water from surrounding wet soil, if any, adjacent to the tank 14 can be drained.

When it is desired to use the cold that has been stored in the tank 14, the thermostatically controled pump 50 will be set in operation. The function of pump 50 is to deliver the liquid coolant in the tank 14 through pipes 46 and 52 and entrance pipe 54 to the manifold 56 located inside the ventilation air duct 51. The delivery pipes 46 and 52 are well insulated by, e.g., conventional fiber glass pipe insulation tube. The manifold 56 is connected to a bank of tubes 58.

As the complete air-conditioning system in a cooling environment is in operation, the warm air (indicated by arrow 57) from the returning duct passes through the bank of tubes 58 and gives up the heat to the liquid coolant. Hence, the warm air 57 becomes cooler (indicated by arrow 53) and will be recirculated throughout the house or other environment which is to be cooled. In the meantime, the coolant in the bank of tubes 58 picks up the heat from the passing warm air as it flows through the manifold 60 and insulated pipe 62 to the cold storage tank 14. Then, the cooling process cycle repeats.

When the air-conditioned environment reaches a desired temperature by the cooling system, the pump 50 will be shut off automatically by an electronic or electromechanical thermostatic control 48 which is connected to and actuated by a temperature sensor 55 that monitors the temperature of the warm air. As mentioned previously, the same thermostat control will start the pump 50 when the preset temperature of the air-conditioned environment is reached.

In order to increase the heat transfer rate between the liquid coolant 2 in the tank 14 and water 32 in the bags 30, the liquid coolant is preferably in circulation. This arrangement can be accomplished by turning the valve 59 to the position 66. In this case the liquid coolant 2 is circulated under the pressure of pump 50 through insulated pipes 46 and 68 and back to the cold storage tank 14. Since this operation is required only during cold seasons, the valve setting at position either 66 or 64 can be manually adjusted.

When the temperature above the ground is higher than the temperature inside the cold storage tank 14, the operation of the heat pipes 12 would seem to be reversed from that operation as described previously. However, in this case, the condensed liquid in the section 20 (now functioning as condenser sections) cannot rise up against gravity, and the heat pipes would cease to function. There will be no danger on warm days of losing the cold from the storage tank 14 to the warmer environment around the sections 16 of the heat pipes.

While a preferred system and a preferred combination of heat pipes and water bags for use in such a system have been illustrated and described, it is to be understood that various changes and arrangement of parts may be made without departing from the spirit and scope of the invention as defined in the appended claims.

I claim:

1. A system for extracting, transmitting, storing, recovering and utilizing cold, said system comprising:
   a. apparatus for extracting cold from the environment;
   b. transmitting means comprising a heat pipe for transmitting said cold from environment above the ground to a location below the surface of the ground;
   c. storage means for storing cold including containers of freezable liquid submerged in liquid coolant, said containers and liquid coolant being located at said location below the surface of the ground for receiving and storing cold transmitted thereto by said transmitting means;
   d. recovery means for recovering cold from said storage means and delivering it to a second environment; and
   e. utilizing means connected to said recovery means for receiving cold therefrom and dispersing said cold throughout said second environment.

2. A system as defined in claim 1 wherein said storage means includes a plastic liner for containing said liquid coolant at said location below the surface of the ground.

3. A system as defined in claim 1 wherein said freezable liquid is water which changes phase to ice upon being cooled by said liquid coolant.

4. A system as defined in claim 2 wherein said liquid coolant is a substance which is capable of maintaining liquid state upon being cooled by said transmitting means.

5. A system as defined in claim 2 including insulation means located about said plastic liner for minimizing loss of cold to the surrounding earth.

6. A system as defined in claim 1 wherein said utilizing means includes a bank of flow tube means and means for passing relatively warm air across said flow tube for cooling said air.

7. A system as defined in claim 6 wherein said recovery means includes a closed-circuit pipe means having a first portion thereof connected to said storage means at said location below the ground, a second portion thereof extending from said location to said bank of flow tube means for delivering liquid coolant thereto, and a third portion extending from said flow tube back to said first portion for delivering said liquid coolant from said flow tube to said first portion.

8. A system as defined in claim 7 including pump means located in said second portion of said closed-circuit pipe means for pumping said liquid coolant through said second portion to said bank of flow tubes means.

9. A system as defined in claim 6 wherein said bank of flow tube means includes a manifold and a plurality of flow tubes connected to said manifold; and said recovery means including pump means for pumping said liquid coolant from said location below the ground to said manifold.

10. A system as defined in claim 7 including valve means located in said second portion of said closed-circuit pipe means for controlling said liquid coolant flow through said second portion to said first portion without passing through said bank of flow tube means.

11. A system as defined in claim 1 wherein said container resembles an inflated plastic bag.

12. A system as defined in claim 1 wherein said container includes at least one filling tube for exchanging of substance in said container.

* * * * *